United States Patent
Singh et al.

(10) Patent No.: US 7,181,229 B2
(45) Date of Patent: Feb. 20, 2007

(54) SYSTEM WHICH AUTOMATICALLY DISABLES OR SWITCHES OFF A CELLPHONE

(76) Inventors: Yash Pal Singh, DLF Qutab Enclave, Phase-I, Gurgaon (IN) 122002; Anirudh Singh, DLF Qutab Enclave, Phase 1, Gurgaon (IN) 122002; Manu Singh, DLF Qutab Enclave, Phase-I, Gurgaon (IN) 122002; Lakinder Singh Verma, DLF Qutab Enclave, Phase I, Gurgaon (IN) 122002

( * ) Notice: Subject to any disclaimer, the term of this patent is extended or adjusted under 35 U.S.C. 154(b) by 0 days.

(21) Appl. No.: 10/490,833

(22) PCT Filed: Sep. 23, 2002

(86) PCT No.: PCT/IN02/00191

§ 371 (c)(1),
(2), (4) Date: Mar. 25, 2004

(87) PCT Pub. No.: WO03/028342

PCT Pub. Date: Apr. 3, 2003

(65) Prior Publication Data

US 2004/0198306 A1    Oct. 7, 2004

(30) Foreign Application Priority Data

Sep. 25, 2001   (IN) ........................................ 980/01

(51) Int. Cl.
*H04Q 7/20* (2006.01)
*H04B 1/38* (2006.01)
*H04B 7/00* (2006.01)
*H04M 1/00* (2006.01)

(52) U.S. Cl. .............................. 455/456.4; 455/456.5; 455/456.6; 455/68; 455/565

(58) Field of Classification Search ............. 455/456.4, 455/550.1, 422.1, 418, 565, 421, 68
See application file for complete search history.

(56) References Cited

U.S. PATENT DOCUMENTS 6,011,973 A * 1/2000 Valentine et al. ........ 455/456.6

(Continued)

FOREIGN PATENT DOCUMENTS

EP    0 880 296 A1    5/1998

(Continued)

*Primary Examiner*—George Eng
*Assistant Examiner*—Un C. Cho
(74) *Attorney, Agent, or Firm*—The Webb Law Firm

(57) ABSTRACT

This invention relates to a system for disabling a cellphone in the presence of certain conditions, and for switching it off in the presence of some other conditions, while allowing its use in the normal fashion in the absence of these two sets of conditions. Thus, this system regulates cellphone use in accordance with specified restrictions in specific locations, and allows its normal functioning when these restrictions are not required. Specifically, a first condition is an attempt to operate a cellphone by the driver of a vehicle having its ignition on and/or moving above a certain speed. In such a condition the system would automatically disable the OK switch of a cellphone and may also perform the CALL END function. In the second condition the system automatically switches off any cellphone in the ON condition being carried on the person of an individual occupying a seat in an aircraft, or a committee room, or any other such location where such a restriction is envisaged. The system also makes a provision for automatic sequential dialing of a specified set of numbers like the police, medical services etc. during an emergency by allowing overriding any regulatory restriction. In addition, this invention also relates to control circuits provided in said system for preventing tampering with or bypassing the system by cellphone users.

8 Claims, 8 Drawing Sheets

U.S. PATENT DOCUMENTS

| | | | |
|---|---|---|---|
| 6,122,486 A * | 9/2000 | Tanaka et al. | 455/68 |
| 6,327,485 B1 * | 12/2001 | Waldron | 455/575.3 |
| 6,675,002 B1 * | 1/2004 | Lipovski | 455/194.1 |
| 6,690,940 B1 * | 2/2004 | Brown et al. | 455/456.4 |
| 6,782,253 B1 * | 8/2004 | Shteyn et al. | 455/414.1 |
| 6,782,266 B2 * | 8/2004 | Baer et al. | 455/456.4 |
| 6,832,093 B1 * | 12/2004 | Ranta | 455/456.4 |

FOREIGN PATENT DOCUMENTS

| | | |
|---|---|---|
| EP | 1 035 746 A1 | 9/2000 |
| JP | 11-1168767 | 6/1999 |
| JP | 11-285070 | 10/1999 |

* cited by examiner

SYSTEM WHICH AUTOMATICALLY DISABLES OR SWITCHES OFF A CELLPHONE

BACKGROUND OF THE INVENTION

1. Field of the Invention

This invention relates to a device which automatically disables or switches off a cellphone when first or second conditions are respectively present and automatically enables the cellphone when said conditions no longer exist. The first condition is an attempt to operate a cellphone by the driver of a vehicle when its ignition is on or it is moving above a certain speed. The second condition is when a person occupying a seat in various locations such as in an aircraft or auditorium endeavors to use the cellphone.

2. Description of Related Art

Reference is made to the first condition, namely an attempt to use a cellphone by the driver of a vehicle having its ignition on and/or moving above a certain speed. When a call is received, the user picks up the cellphone, looks at the number of the caller on its display panel, and switches on the OK switch of the cellphone in order to receive the call. In a likewise manner, when the user intends to make a call, it becomes necessary for him to press the number buttons followed by the OK switch on the front panel of the cellphone. In both instances, and when such an operation is carried out while the user is driving a vehicle, his attention is diverted from the road and traffic condition. Such a distraction is enhanced when he engages into an ensuing conversation while driving. In fact, several reports reflect a very strong association between traffic accidents and cellphone use by vehicle drivers. Such a danger would also exist, with the provision of facilities like SMS, Multimedia and Internet Access, and Bluetooth® technologies being incorporated in newer generations of cellphones. Thus, several local governments have prohibited the use of cellphone by individuals while driving a vehicle. The ensuing danger of use of a cellphone while driving is recognized in all major countries and similar prohibitions are envisaged. However, even in instances where such prohibition does exist, people tend to violate the rule and continue to use cellphones while driving vehicles, and enforcing the law becomes next to impossible.

Hands free cellphones are known in the art in order to obviate to some extent the danger of possible accidents while driving. However, even the use of such hands free cellphones does not ensure complete safety since the driver still has to operate the OK and CALL END switches of the cellphone upon receiving the call and completion of the conversation respectively, and concentration on conversation can distract the driver's attention, and is known to significantly impair the reaction time of a driver. Thus the use of hands free cellphones also is not allowed in several cases. Even if the use of hands free cellphones were permitted, the proposed system would serve a vital function by blocking the use of a cellphone in the normal mode by vehicle drivers without employing the hands free kit.

The second condition refers to the situation when a cellphone in the on state is carried on the person of an individual occupying a seat in locations such as conference rooms, seminar halls, theaters, or aircraft where cellphone use is to be prohibited.

In the past, several systems have been proposed for regulating cell phone use in different locations and situations. The following four documents are relevant to this connection, and it is in order to outline a brief description of these techniques and their limitations at this point.

JP 11 168767 A (NEC CORPORATION) "D1": This system has been developed with a view to make communication through a wireless phone system in a moving vehicle impossible. The system incorporates a unit that generates a logic hi or lo signal to denote either the vehicle ignition being on or off or, alternatively, another unit that generates a logic hi or lo when the vehicle speed is high or low. The vehicle condition is subsequently transmitted to the mobile phone via radio waves and its operating mode is controlled as desired. Another alternative mode of transmitting the vehicle condition to the cell phone through infrared signals is also described.

The system has several limitations. Firstly, it makes no provision to control cellphone use in locations other than a vehicle. Secondly, if the infrared mode is employed then an unscrupulous individual can easily block transmission of the blocking command and the operation of the system can be severely compromised. It is difficult to confine the area of influence of radio waves—the other alternative proposed in this document—to just the space occupied by the driver and, therefore, the system is likely to block the mobile phones of the other passengers as well. The system also makes no provision for making emergency calls from a vehicle in motion by overriding the stipulated restriction.

JP 11 285070 A (KOKUSAI DENKI KK) "D2": The system described in this document also aims at restricting use of mobile phones in moving vehicles with a view to prevent traffic accidents. The system proposes to incorporate in the cell phone a pick up for the vehicle ignition noise. This noise signal is processed through a wave-shaping unit, and the resulting signal is converted into a voltage signal by a frequency/voltage converter to arrive at the engine rpm. In order to eliminate the interference of the ignition noise signals from other vehicles on the highway, the system also incorporates a means of detecting the particular vehicle moving through the electromagnetic field of the communication system and, after comparison with a reference speed to be set up in the mobile phone, arrives at the condition of the particular vehicle as either running or stopped. The system also requires the driver to select a special "DRIVE KEY" for its activation. When the driver selects the DRIVE KEY and the system detects the vehicle in the running condition, the system locks the keyboard of the mobile phone and also sends a message to the caller that the called person is driving a vehicle.

This system also suffers from several limitations. Firstly, the means of establishing the vehicle condition running or stopped is very complicated. Because of the range within which the proposed system in the mobile phone would pick up the engine ignition noise is fairly extensive, it would be picked up by the mobile phones of the other passengers as well. The DRIVE KEY has been incorporated to enable persons other than the vehicle driver to use their cell phones. But a driver can also misuse this provision since by not using this particular key the entire system can be bypassed. The provision to set the speed limit below which the system permits normal mode of communication can also be misused by setting a relatively higher speed up to which the vehicle driver can use the mobile phone in the normal mode. There seems to be no provision for regulating cell phone use in locations other than in a moving vehicle.

EP 1 035 746 A1 (SONY INTERNATIONAL (EUROPE) GMBH) "D3": This document describes a system for protecting a predetermined area within which a cell phone has to be regulated in a prescribed manner. For this, a mobile station transmits a protection signal that is recognized by any cellphone within the area and the cellphone is made to operate in a particular mode characterized by the signal. The cell phone is restored to its original mode if it is carried outside that area or if a certain prescribed time elapses after the prohibiting signal is received by it. There is a provision for several modes. In some sensitive areas, the high frequency portion of the cell phone may be switched off to avoid the possibility of interference with other sensitive equipment, while, in other areas, it may be put in a silent mode and, in some cases, the suppressed output may even be replaced by a visual or non-audible output. The mobile base station has a unit to generate the protection signal, which is modulated and radiated to cover the desired area. The mobile phones have to incorporate a protection signal detection section and a means to change the mode of its operation. The document covers a large number of alternative wireless systems categorized in terms of the modulation techniques used, as well as different types, of signals employed ranging from broadcast and pager systems, optical/infrared systems, and acoustic/ultrasonic systems, and discusses their relative merits and limitations. The preferred system is based on Bluetooth® operating at 2.4 GHz.

While the system has several features that are advantageous in specific applications like blocking all cell phones with a desired area, it is not practicable to employ it for blocking cell phone use by vehicle drivers, since the system would block not only the cell phones of drivers as well as passengers of vehicles in the zone covered but would also block cell phone use by occupants of offices and residential buildings within the covered area. It would also not be practicable to incorporate in a single mobile phone the various types of protection detection signals described in the document, and only one or two of these say the infrared and the Bluetooth® may be used. As discussed earlier, the infrared can be blocked and the mobile phone can be used, thus bypassing the regulation. Even if a low power jamming station employing Bluetooth® were to be incorporated within a vehicle, it would possibly cover the entire vehicle, thus preventing use of a mobile phone even by the other passengers. There is also some concern about the health-related considerations due to continued exposure to the 2.4 GHz signal used for Bluetooth®.

EP 0 880 296 A1 (NEC CORPORATION) "D4": This document describes a transmission restricting system comprising a radio communication terminal equipment and a transmission restricting device applicable to a specific area, as well as for drivers of vehicles in motion. The system is based on the generation and transmission of a command code included in a magnetic field pattern at the entrance or exit of an area to command the transmission interruption to a radio communication terminal equipment, as well as that of another command code included in a magnetic field pattern to command the releasing of the transmission interruption to the radio communication terminal equipment also disposed at the entrance or exit of that area. The radio communication terminal equipment comprises means of detecting the magnetic field patterns and interpreting it for interrupting or releasing radio transmission to it as per command. Any radio communication terminal equipment being carried in the prohibited area detects the magnetic field pattern of the transmission interruption controller and interprets the command code to prohibit communication within the area. When the radio communication terminal equipment is being carried out of the prohibited area, it detects the magnetic field pattern of the transmission interruption release and interprets the command code to enable communication in a normal mode outside that area. For regulating use of a radio communication terminal equipment by the driver of a vehicle being driven above a certain speed, the magnetic field pattern of the transmission interruption controller is set up in the area of the seat of the driver and, thus, the radio communication terminal equipment cannot be used by the driver of a vehicle under these conditions. At the same time, the magnetic field pattern of the transmission interruption releaser is set up around the remaining seats in the vehicle, enabling the navigator and other passengers of the vehicle to use the radio communication terminal equipment under the same conditions.

The most attractive feature of this system is obviating the need for continuous transmission of the transmission interruption signal in sensitive areas, like hospitals. But while the system is positively driver specific in blocking radio communication in a moving vehicle allowing the other passengers to talk, it exposes the driver as well as the other passengers to the magnetic fields of the transmission interruption controller and the transmission interruption releaser continuously all through the duration of a journey. This is undesirable from the point of view of health of the occupants of vehicles. The system is also a very complex way of realizing a vehicle driver specific system for blocking cell phone use, while enabling the other passengers to use cell phones in a moving vehicle. The system would also be susceptible to malfunction due to distortion in the magnetic field patterns if any object having ferromagnetic material in it is kept in the vicinity of the poles of electromagnets installed for setting up of the desired pattern of magnetic field.

The four documents cited in the Search Report and in the PCT Examination Report have been reviewed in the foregoing section. Some limitations of these have also been briefly outlined. The jamming system of D3 prohibits cell phone use in a specified area by making use of high frequency signals that are considered to be a health hazard and cannot be employed for blocking cell phone use by drivers of vehicles in motion without also blocking use of cell phones of every other user in the area falling with the range of the transmitter of the blocking signal. The other three systems also make use of radio transmission for blocking cell phone use in vehicles. Since radio transmission is difficult to be confined to a small area, the systems described in the cited documents are inherently not capable of being vehicle driver specific. In fact, the system described in D4 attempts to solve this problem by resorting to the artifice of creating a specific magnetic field pattern around the seat of the driver for setting up a transmission interruption space, and another distinct field pattern to set up a transmission interruption release space around the seats of the other occupants of the vehicle.

SUMMARY OF THE INVENTION

The present invention proposes to solve these problems by firstly making use of low-frequency signals for communicating the nature of regulation desired and, secondly, by making use of electrical signals rather than electromagnetic or radio waves and, thirdly—and most importantly—through use of capacitive couplings for transmission of the signal to command a change in the status of the cell phone. For example, the signal characterizing the use of a cell phone by a vehicle driver in accordance with the state of the vehicle is carried out through two capacitive couplings—one between a foil embedded in the seat of the vehicle driver and another between the band of the driver and a foil incorporated within the cell phone. The frequency and power level of the signal employed pose no health hazard and the system is intrinsically driver specific. The technique for monitoring the state of the vehicle is also very simple and direct and is not susceptible to corruption due to interference from another vehicle on the road, necessitating a very elaborate method in document D2. Incorporation of a means for automatic dialing of a set of numbers during an emergency by overriding any regulatory stipulation is another novel feature of the proposed system meeting the concern expressed by a cross section of users and lawmakers. The regulation provided by the proposed system is also automatic and does not depend on the user being required to use a DRIVE KEY or selecting a particular speed up to which the mobile phone be used by a driver in a moving vehicle, as stipulated in D2.

Since the proposed system makes use of a signal of low frequency in a band far removed from those employed in documents D1 to D4, the type of signal generator for communicating a condition to the cell phone, or the means to detect and interpret the transmitted signal in the cell phone, as well as the technique for controlling the mode of its usage in the proposed system are very different from the systems described in the four documents cited in the Search Report and the Examiner's Report. Sections [0042] to [0052] of D3 attempt to cover the entire range of signal transmission techniques. The use of the capacitive coupling mode of communicating regulatory conditions to a cell phone has not been employed anywhere so far, and constitutes a major innovative step. This mode was arrived at after a critical appraisal of the disadvantages and inherent limitations of various alternatives in current use. Choice of this mode was guided by the need to develop a system that would eliminate health hazards attributed to prolonged exposure to high-frequency radiation, and to arrive at a system that is inherently vehicle driver specific, leaving the other passengers free to use their cell phones. The extension of this technique for regulating cellphone use in other public places, like libraries or theaters, became a natural corollary of the proposed system. The fact that these four cited documents also attempt to enhance safety of transportation systems by inhibiting cell phone use by drivers of moving vehicles, and that two of these also aim at restricting cell phone use in other locations as well, is the only major aspect that the present proposal has in common with the systems described in these cited documents. In fact, a critical appraisal would reveal that the system proposed in this document is not only novel but also offers several advantages:

1. use of low power low frequency signals posing no health hazards;
2. use of capacitive coupling, making it an inherently vehicle driver specific system, leaving the other passengers free to use their cell phones;
3. provision to call a set of designated numbers during an emergency; and
4. use of a technology that is economical and is easy to adopt.

An object of this invention is to propose a system for regulating cellphone use in accordance with stipulated regulatory conditions, these being the disabling of a cellphone used by a driver in a vehicle, and switching it off in an aircraft or auditorium, etc., hereafter designated as the first and second conditions, respectively.

Another object of this invention is to propose a system which automatically disables a cellphone when said first conditions is present and automatically enables the cellphone when said first condition no longer exists, and automatically switches off the cellphone in the presence of the second condition.

Another object of this invention is to propose a system capable of distinguishing between the first and second conditions and initiating the execution of appropriate regulatory processes stipulated in such locations, and incorporating control and switching circuits for regulating cellphone use, which are simple in construction.

A still further object of this invention is to propose a system for disabling a cellphone in the presence of said first condition, and enabling the cellphone upon removal of said conditions, said system having control circuits, which cannot be tampered or bypassed by a cellphone user.

Another object of this invention is to propose a system for allowing a user the facility for automatic sequential dialing of a specified set of numbers like the police, medical services etc. during an emergency by overriding any other stipulated regulation on cellphone use.

Another object of this invention is to propose a system that would present no health hazard to the cellphone users, while enhancing road and air travel safety as well as minimizing public inconvenience in its area of use.

According to this invention there is provided a system for disabling a cellphone in the presence of a first condition and enabling said cellphone upon removal of said condition, and switching off a cellphone in the presence of a second condition comprising:

i) a signal generating circuit for generating signals characterizing the presence of a first or a second condition;
ii) a signal detection and processing circuit provided within said cellphone for receiving and processing a signal from said generating circuit, and identifying the presence or absence of a particular condition;
iii) an OK switch disabling circuit connected to said signal detection and processing circuit, said OK switch disabling circuit connected to the OK switch of the cellphone and disabling it in the presence of a signal corresponding to the first condition at the input to the signal detection and processing circuit;
iv) a link and control circuit connected to said OK switch disabling circuit;
v) a call end circuit connected to said link and control circuit and also connected to the call end switch of the cellphone, and adapted to perform its function in the presence of a signal corresponding to the first condition at the input of the signal detection and processing circuit, and when said OK switch disabling circuit is disabled.
vi) said link and control circuit also connected to the signal detection and processing circuit and adapted to initiate the function of the call end circuit in the presence of said first condition.
vii) A circuit to perform the switching off function of the cellphone and for disabling its on function in the presence of a signal corresponding to the said second condition at the input to the signal detection and processing circuit.
viii) An emergency switch for enabling the cellphone by overriding any stipulated regulatory restriction on cellphone use.

As stated earlier, in this context the first condition relates to an attempt to use a cellphone by the driver of a vehicle having its ignition on and/or moving above a certain speed; while the second condition refers to a cellphone in the on state being carried on the person of an individual occupying a seat in aircraft or auditoria etc.

DESCRIPTION OF THE PREFERRED EMBODIMENTS

Figure 1:
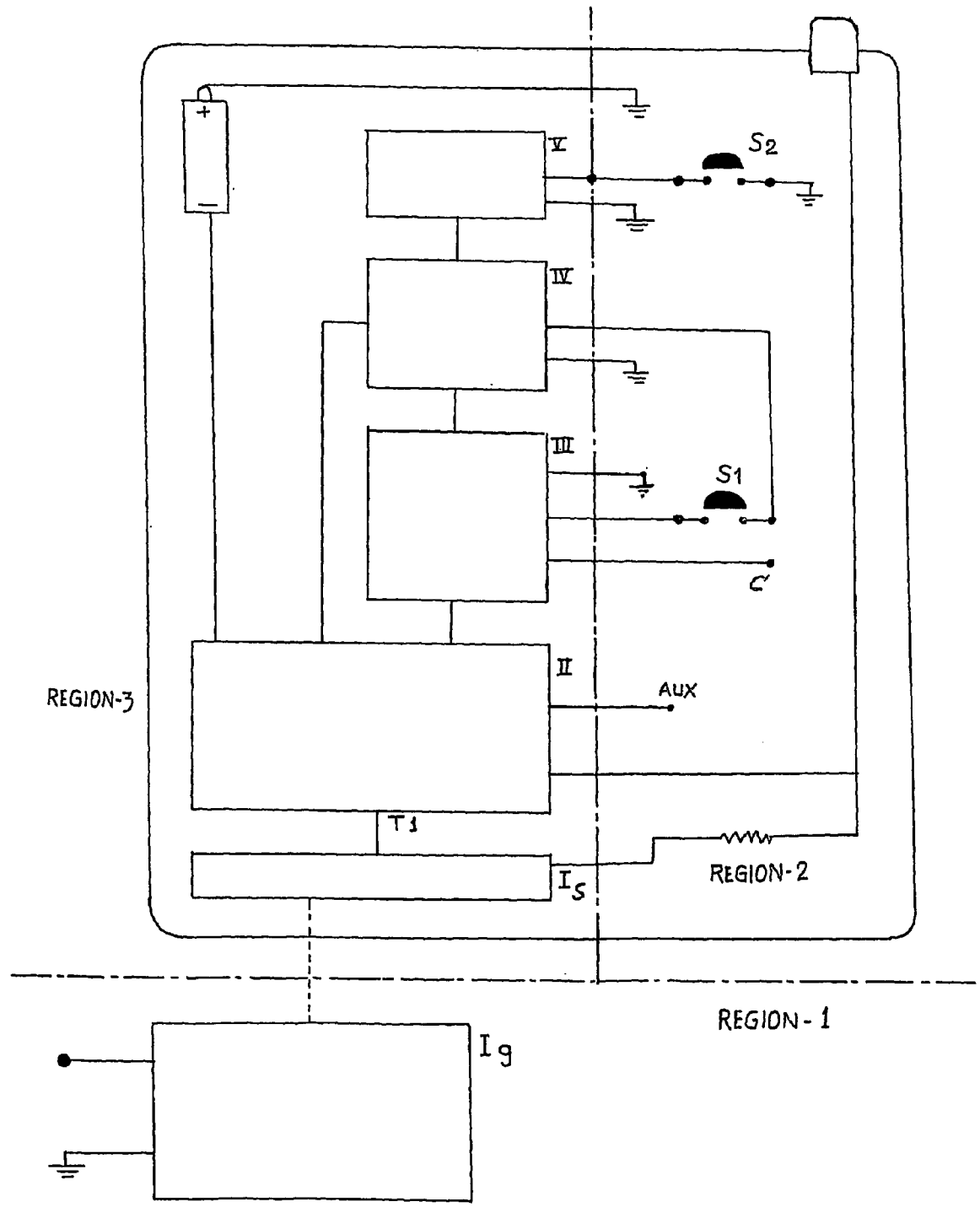
FIG. 1 shows a block diagram of a basic circuit according to the present invention.

Referring to FIG. 1, the block diagram depicts a Signal Generating Unit I comprising a Signal Generating and Transmitter Circuit Ig that may be positioned either below the driver's seat or inside the dashboard of the vehicle. The Signal Generating Circuit Ig is linked to a conducting foil F1, enclosed inside the seat of the driver, and forming one part of a first capacitive coupling CC1 in a manner shown in FIG. 2. Another conducting foil F2 provided in the cellphone constitutes a part of the second capacitive coupling CC2, and links circuit Ig to a signal detection and processing circuit II through the terminal T1. The Signal Generating Circuit Ig is adapted to be connected to the power source through the Control Circuits of FIG. 4 or 6a, and would remain in the switched on condition as long as the ignition of the vehicle remains on and/or it is moving above a certain speed, and thus would signal the presence of the first condition.

The Signal Generator Circuit Ig is connected to the Signal Processing Circuit II located inside the cellphone through the first capacitive coupling CC1 which is completed whenever the driver's seat is occupied, and a second capacitive coupling CC2 which is completed whenever the cellphone is held by a person occupying the driver's seat. In such an instance, a disabling signal corresponding to the first condition is fed to Signal Detection and Processing Circuit II and an appropriate command signal is communicated to an OK Switch Disabling Circuit III. The Link and Control Circuit IV is connected to circuits in II, III, and V, and depending upon the status of signals controls the operation of a Call End Circuit V as shown in FIGS. 1 and 3.

In a vehicle, the Signal Generating Unit I generates the characterizing signal for detecting the condition of the presence or absence of a person occupying the driver's seat, the on or off status of the ignition switch of the vehicle, and/or its state of motion for identifying the first condition. It will be apparent that when the driver is present in the seat of a vehicle and its ignition is on and/or if it is moving above a certain speed, a signal is generated to disable a cellphone CL, which is the first condition, and whereby the driver cannot utilize the cellphone during the aforesaid first condition. However, for any passenger of the vehicle not occupying the driver's seat, the cellphone would remain in an enabled condition.

Figure 2:
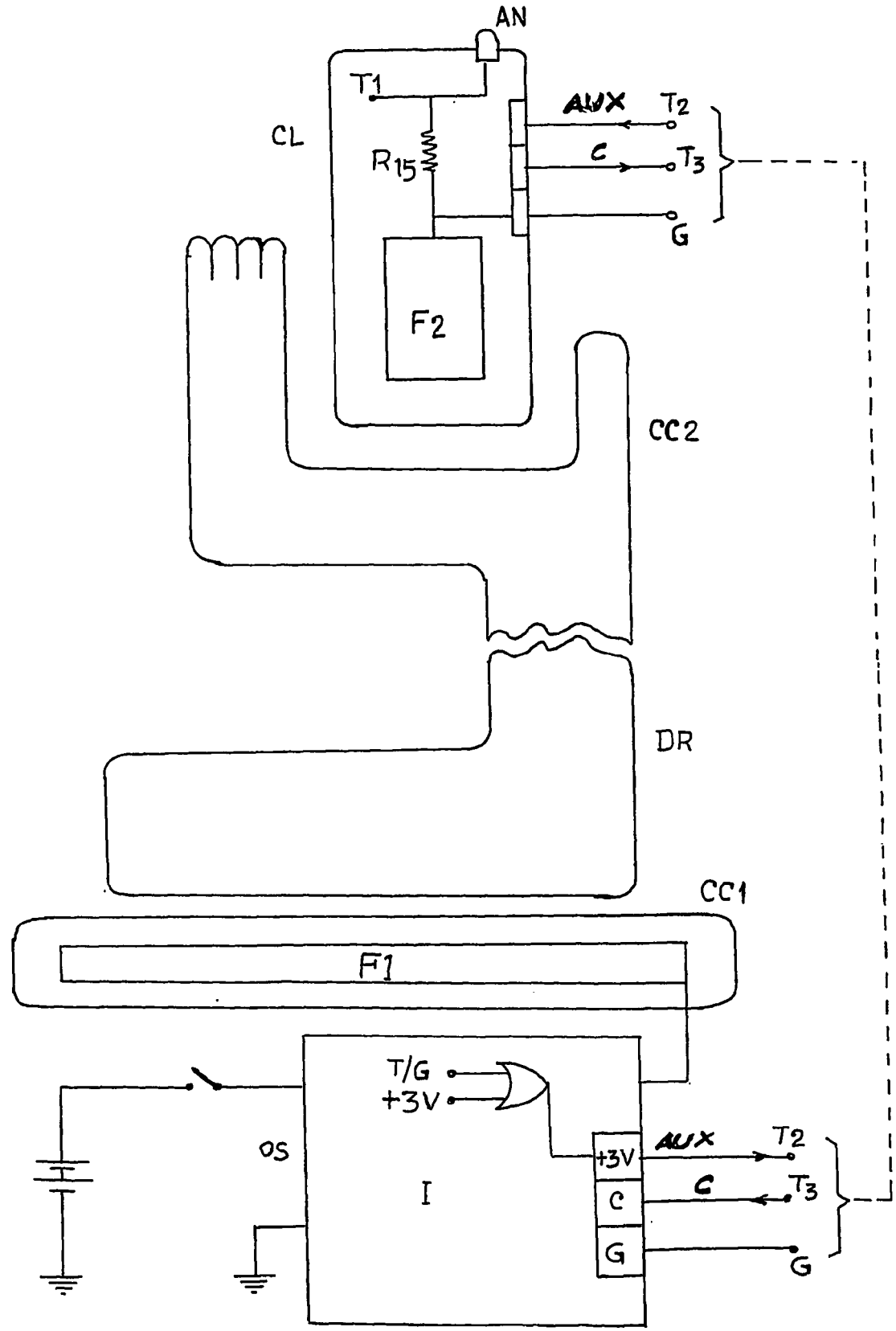
FIG. 2 shows the block diagram of a Signal Generating and Detecting Circuit provided in the circuit of FIG. 1.
Figure 3:
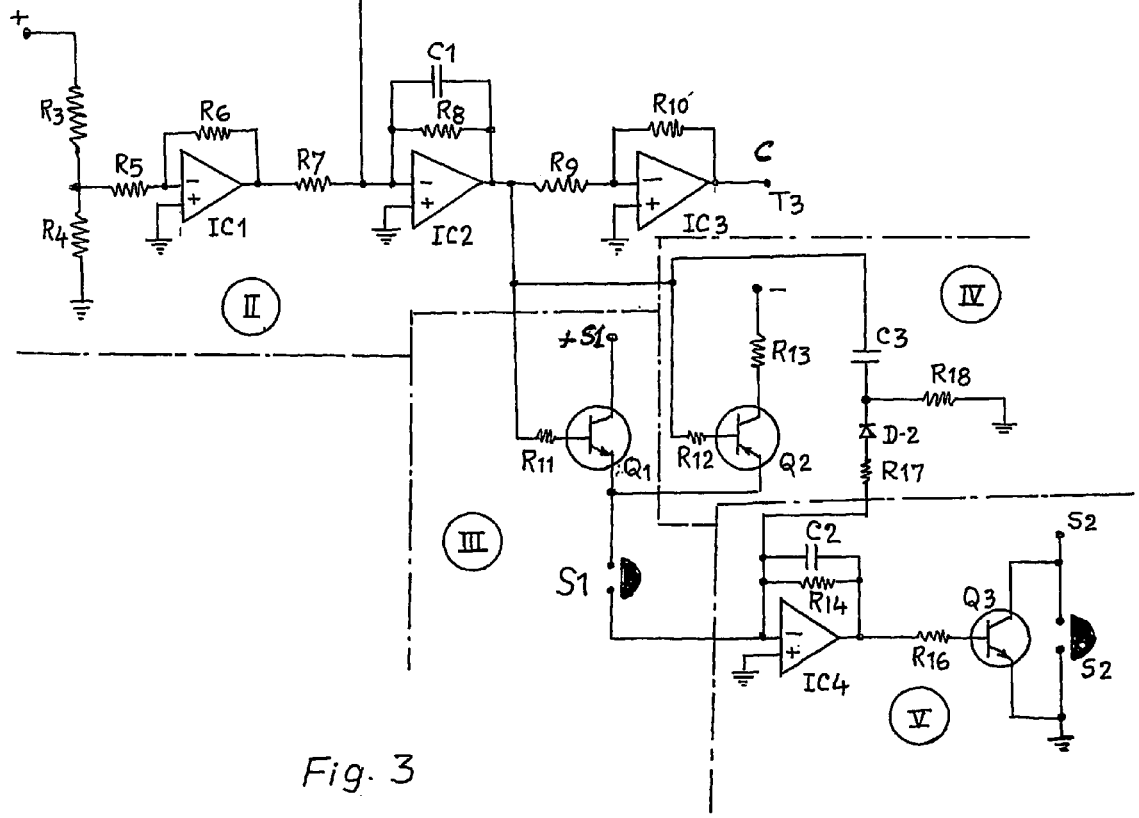
FIG. 3 shows in detail the circuit of FIG. 1.

Referring to FIGS. 2 and 3, a conducting foil F2 provided inside the cellphone is connected to the cellphone antenna ANT through a resistor R15. One end of resistor R15 is connected to the ground of the cellphone CL while the other end is connected through input terminal T1 to the inverting input of an operational amplifier OP-AMP-2 such as IC2 through a diode D1 and a resistance R2 of the Signal Detecting and Processing Circuit II. Another input to OP-AMP-2 comes from the output of a further operational amplifier OP-AMP-1 such as IC1 through a resistance R7. The input to OP-AMP-1 is from a potential divider R3 and R4 connected to the positive terminal of the cellphone supply battery. The output of OP-AMP-2 is fed to a switching circuit, which by way of example may be a npn transistor TR1. Thus, the output of OP-AMP-2 is fed to the base of a transistor TR1 of the OK switch disabling circuit III connected between the ungrounded side of an OK switch S1 of the cellphone and the system supply to this end. This is achieved by removing the connection between the OK switch S1 and the system supply point in the cellphone, and inserting the transistor TR1 in series with switch S1. The other end of the OK switch S1 is disconnected from the ground, and connected to the negative input of operational amplifier OP-AMP-4 of call end circuit V. When the signal across the resistor R15 is zero, the output of the potential divider R3, R4 is so adjusted as to provide a positive input to the base of TR-1 through biasing resistor R11 and put it in a conducting mode, and therefore calls can be received or made in a normal fashion. In this condition the output of operational amplifier OP-AMP-4 would be a negative pulse.

Thus, in the absence of a signal to terminal T1, which will arise in an absence of the first condition, the output of OP-AMP-1 would be negative and that of OP-AMP-2 positive and whereby transistor TR-1 would be forward biased. Thus, the switch S1 would function in a normal fashion. Also when switch S1 is closed, transistor TR3 of circuit V will not conduct and switch S2 would also function normally.

However, when a person occupying the driver's seat picks up the cellphone CL, a path is completed through the capacitive coupling between his hand and the film F2 inside the cellphone, the resistance R15, and the capacitance between the antenna and the vehicle body. The level of the signals is adjusted to drive the output of OP-AMP-2 of circuit II and consequently the base of transistor TR1 of circuit III to a negative level sufficient to put it in a non-conducting mode, thus blocking the operation of the OK switch S1. Transistor TR2 of control circuit IV may be a pnp transistor and has its collector connected to the negative supply through resistance R13 and its emitter connected to the emitter of transistor TR1 as shown. The base of transistor TR2 is also connected to the output of OP-AMP-2 through resistor R12 as shown. Depending on the polarity of the output of OP-AMP-2, either TR1 or TR2 would conduct. When the output of OP-AMP-2 becomes negative, transistor TR2 will conduct. If the OK switch is pressed in this condition, the output of OP-AMP-4 would become a positive pulse. The output of OP-AMP-4 is connected to the base of transistor TR3 through biasing resistor R16. The collector of TR-3 is connected to the ungrounded terminal of the Call End switch S2, and its emitter is connected to the ground. In this condition, when the driver puts the OK switch S1 of the cellphone on, the positive pulse to the base of TR3 would switch it on, thus automatically performing the call end operation, and would thus prevent the driver from receiving or making a call. In order to make or receive a call it would then be necessary for the driver to switch off the ignition and bring the vehicle to a halt. In this situation the output of OP-AMP-2 and the input to the base of TR1 would again become positive, and the OK switch S1 would become functional, thus restoring the normal operation of the cellphone.

If a passenger other than the driver puts the OK switch on, and hands over the cellphone to the driver, the output of OP-AMP-2 would become negative, driving the base of TR-2 negative. This would cause capacitor C3 to discharge through diode D2 and resistor R17 to the negative input terminal of OP-AMP-4. As a consequence, a positive pulse would appear at the output of OP-AMP-4, and perform the call end function. Thus the driver would not be able to bypass the system under any condition The output of OP-AMP-2 is also connected to the input of OP-AMP-3 as shown in FIG. 3, for generating a control signal for keeping the signal generator in an off state and the cellphone in a disabled state if the cellphone is connected to the oscillator socket by a 3 core cable. One core connects the ground of the cellphone to that of the signal generator, while a core connected to the battery terminal could serve a dual purpose of charging the cellphone battery as well as providing an auxiliary input to OP-AMP-2 (through the resistor R1) for disabling the OK switch S1 of the cellphone, while the oscillator OS remains switched off by means of a control signal obtained from the output of OP-AMP-3 and transmitted to a control switch for putting off the oscillator via the third core of the cable as shown in FIGS. 2 and 3. If this chord is disconnected, the oscillator would be automatically switched on, and the OK switch would remain disabled for the driver as long as the ignition of the vehicle is on and/or it is moving above a certain speed.

Figure 5:
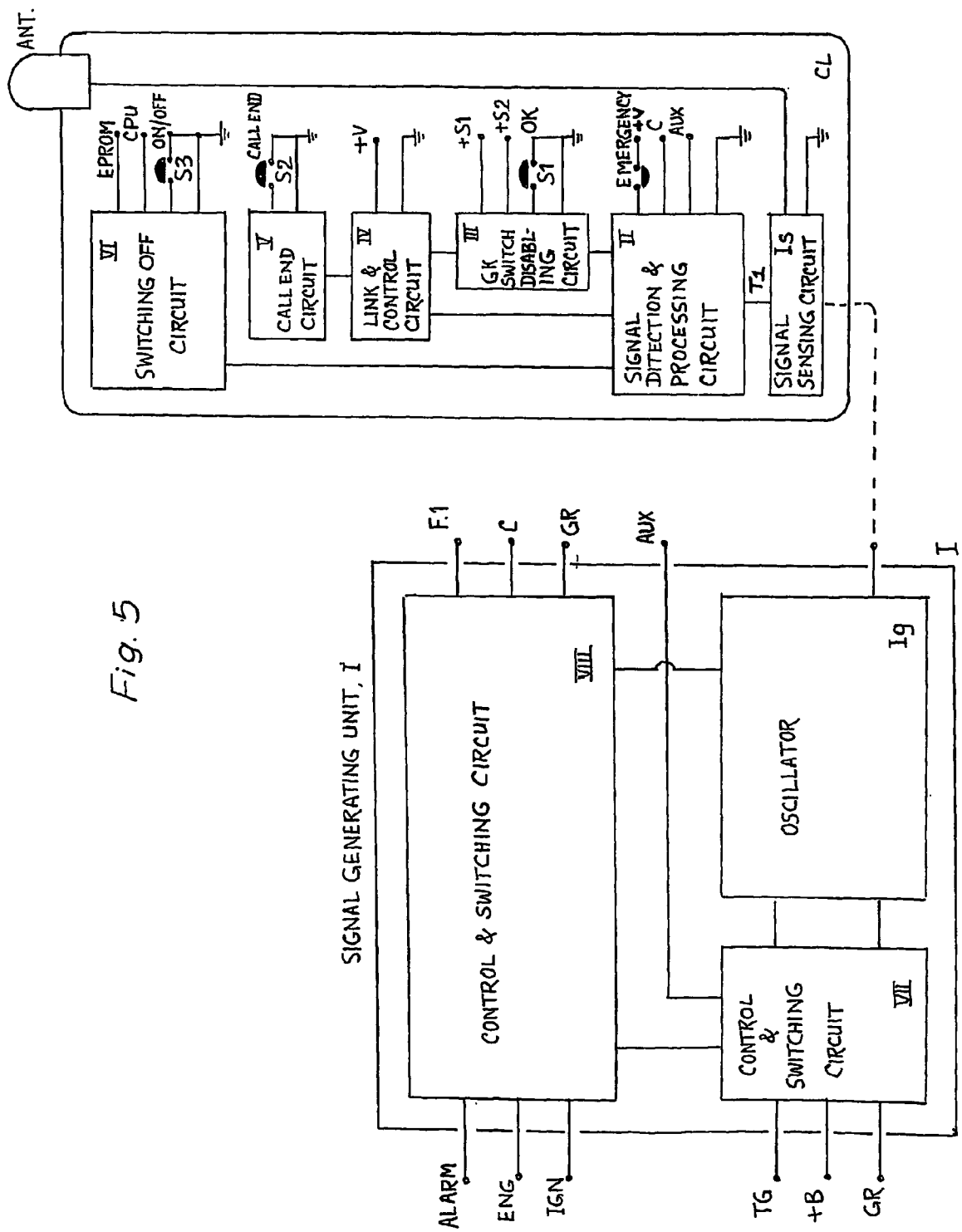
FIG. 5 shows a block diagram of the basic circuit of FIG. 1 in conjunction with certain additional circuits for a switching off operation for the second condition.

Reference is now made to FIG. 5 which shows a modified block diagram of basic circuit of FIG. 1 through a modification of the signal detection and processing circuit II, and the incorporation of an additional functional circuit of block VI, and additional Control and Switching Circuits VII and VIII in the Signal Generating Unit I.

In the Signal Generating Unit I, the first Control and Switching Circuit VII connects the Signal Generator Circuit Ig to the power source, and the Second Control and Switching Circuit VIII provides for disabling the signal generator on receiving a command through terminal C from the cellphone, and enabling/disabling of any other auxiliary equipment and/or initiating an alarm signal indicating any tempering with the system.

It would be apparent that instead of circuit VI, other additional circuits may be added to the basic circuits II to V of FIG. 5, depending upon any additional functional requirements for the system of FIG. 1. Alternatively, circuit VI may also be present along with other additional circuits.

Figure 4:
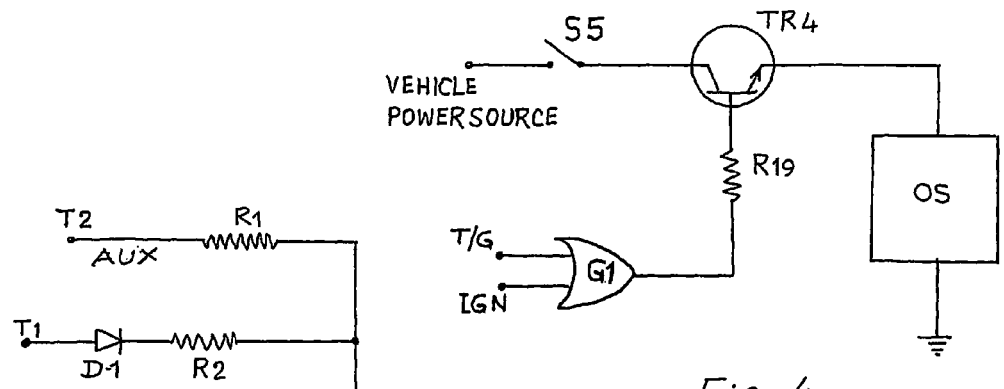
FIG. 4 shows a control circuit for the power supply to the signal generator of FIGS. 1 to 3.
Figure 6A:
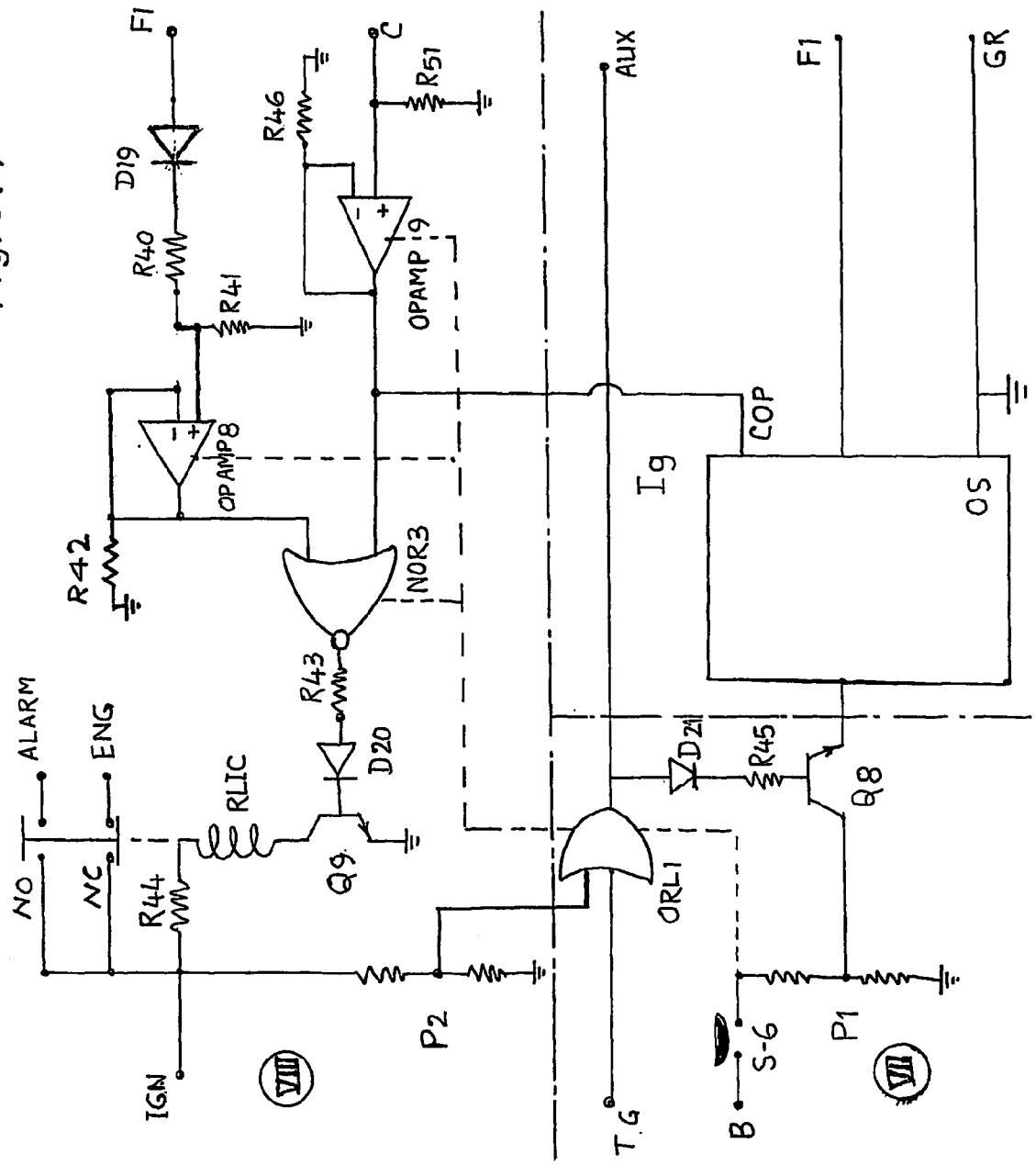
FIGS. 6(a) and 6(b) show various embodiments of Control Circuits for the Signal Generator.

The control and switching circuit VII of FIG. 6(a) shows the modified version of the circuit of FIG. 4 for connecting the signal generator to the power source of a vehicle. A potential divider PI is connected to the vehicle battery output through a pressure actuated switch S6. The oscillator unit OS receives its power from potential divider P1 through a transistor Q8, but all other ICs in the circuit receive their power supply from the potential divider PI directly as shown in phantom lines. The base of transistor Q8 is connected to the output of a two-input logic gate OR4 through a resistor R45 and diode D21. One input of gate OR4 is connected to the output of a taco-generator TG, while the other input is the output of potential divider P2. Thus, as long as the seat of the driver is occupied, and either the vehicle's ignition remains on or it is moving above a specified speed, circuit VII ensures that the oscillator OS would receive its power input, and a signal characterizing the first condition would be communicated to a cellphone held by the driver of a vehicle in this state.

FIG. 6(a) also incorporates circuit to for ensuring that the proposed system for cellphone blocking in a vehicle cannot be bypassed. The normally closed contacts NC of relay RL1 can be inserted in the electrical path between the ignition switch output IGN and the engine ENG. The relay coil RL1C of the relay is connected between the ignition switch output IGN and the ground through a transistor Q9 and a resistor 44 connected in series. FIG. 6(a) also incorporates features for discouraging any attempt to tamper with the system. The positive input of an operational amplifier OPAMP 8, connected as a voltage follower, is connected to the seat foil through a diode D19 and a resistor R40 connected in series. A control input obtained from the cellphone may feed the positive input of amplifier OPAMP 9 connected as a voltage follower. The outputs of OPAMP 8 and OPAMP 9 form the two inputs to the logic gate NOR3. The output of NOR3 is connected to the base of transistor Q9 through a series combination of a resistor R43 and a diode D20. The output of amplifier OPAMP 9 is also connected to the ON/OFF control port COP of the oscillator OS.

Thus, as long as the driver's seat is occupied and the vehicle either has its ignition on or is moving above a specified speed, the oscillator OS remains on, and the signal from the seat foil F1 to operational amplifier OPAMP 8 would keep the output of gate NOR3 low. Thus the relay coil RL1C would not be energized, and the engine would continue to receive its normal ignition input. This situation would remain unchanged if a command were received from a cellphone connected to the control input terminal C. The output of OPAMP 9 would disable the oscillator, and would maintain the output of NOR3 low ensuring normal operation of the vehicle. Any attempt to disconnect the seat foil from the oscillator output or the input to OPAMPS 8 and 9 would drive the output of NOR3 high and energize the relay coil and thus, cut off the power supply to the engine of the vehicle, and would switch on an alarm connected to the normally open contacts NO of relay RL1.

Figure 6B:
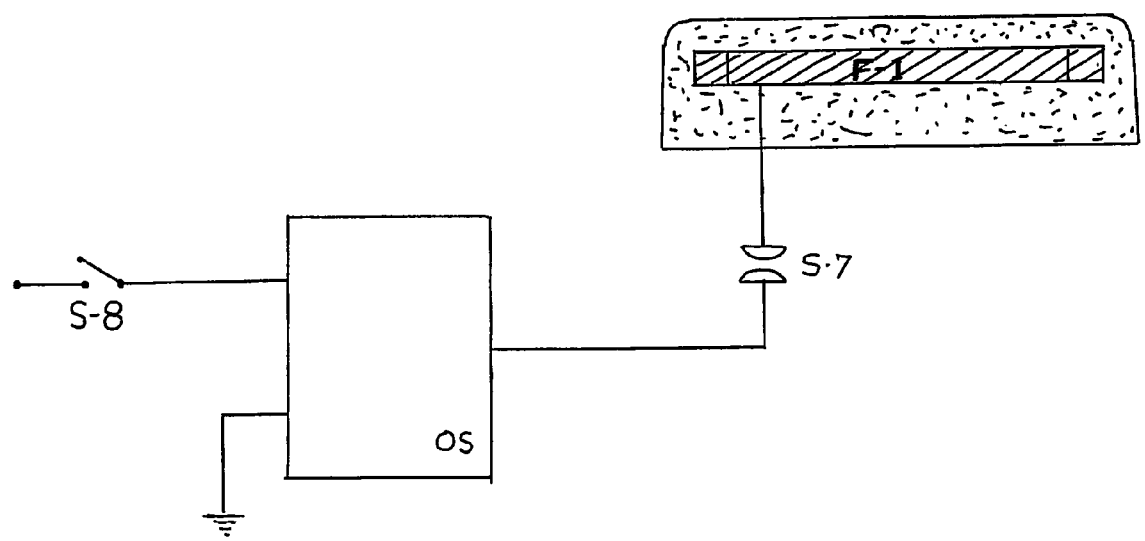

FIG. 6(b) illustrates the connection of a single central oscillator to the individual conducting foil F1 inside each seat in an aircraft or a theater etc. The oscillator is connected to the seat foil F1 through the normally open contacts of a pressure-controlled switch S7. When the seat is occupied, the contacts of the pressure-controlled switch S7 are closed and the oscillator is connected to the seat foil F1. The oscillator OS is connected to the power source through a central switch S8.

Figure 7:
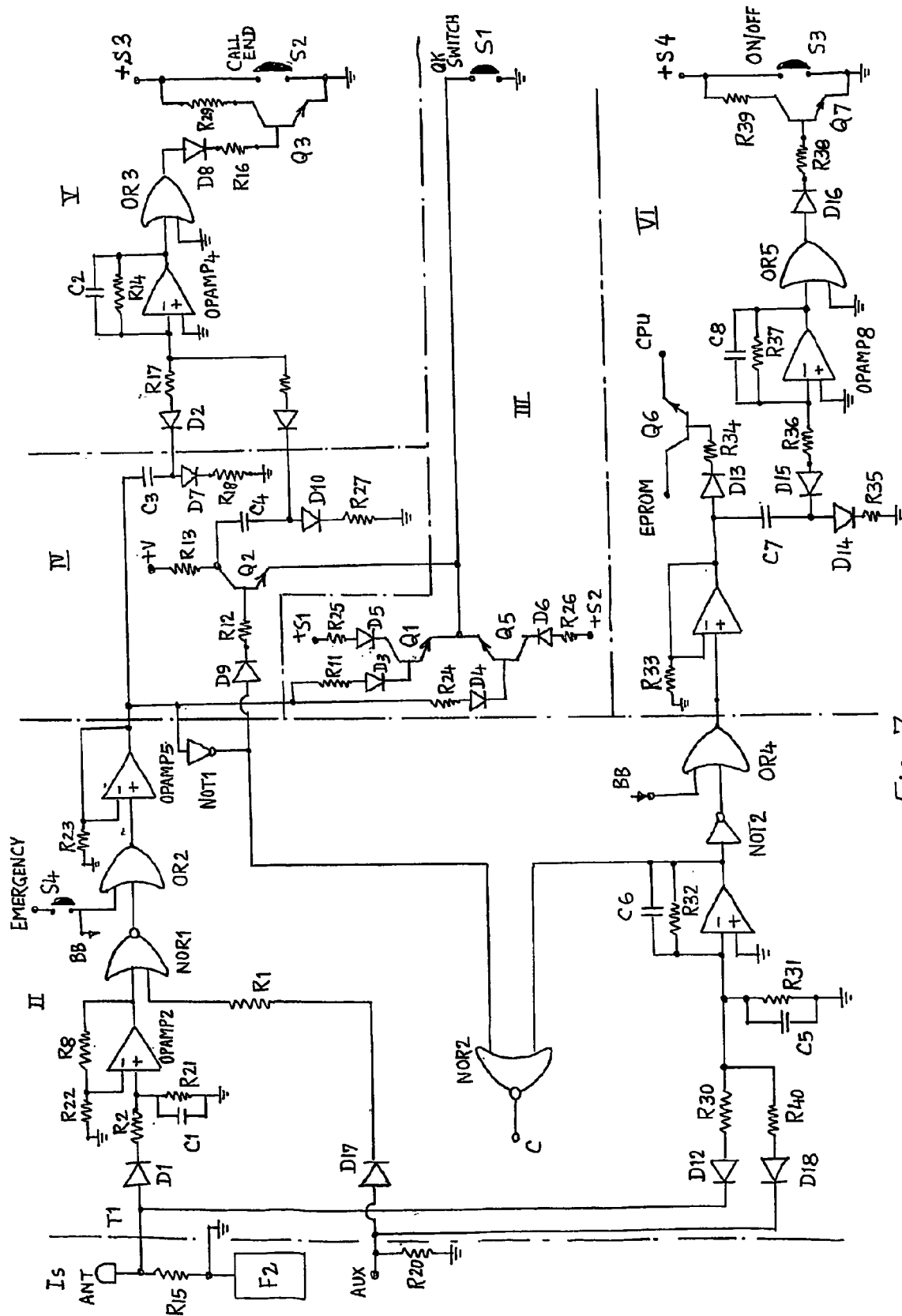
FIG. 7 shows details of a circuit for regulating a cellphone in accordance with all stipulated regulatory conditions according to the present invention.

The circuit diagram of FIG. 7 illustrates one circuit that can be incorporated in a cellphone for realizing all regulatory functions represented by blocks Is to VI in FIG. 5, and corresponding parts of the circuit have also been marked Is to VI. Of these, the circuits in blocks Is, and II to V have functions identical to those of the blocks bearing corresponding numbers in FIGS. 3 and 5.

The circuit of block II has been modified for distinguishing between the first and second conditions for regulating cellphone use, and initiates either the cellphone disabling function through operation of blocks III to V, or initiates the switching off function through the circuits of block VI depending upon the polarity of the signal received from the signal generator. The circuits also incorporate minor modifications for ensuring more uniform signal levels for improved reliability of operation. For example, in block II the biasing input to OP-AMP-2 provided by the output of OP-AMP-1 in FIG. 3 has been replaced by the switching signal levels of logic gate NOR-1 and OP-AMP-5 in FIG. 7, while the logic gate OR-2 enables the facility for overriding any regulatory restriction during an emergency. The circuit of block III also has been modified to accommodate multiple system connections to the OK switch of a particular cellphone, and the diodes prevent false switching due to stray signals. The circuits in blocks IV and V also can be seen to be similarly modified versions of the corresponding blocks of FIG. 3. The circuit of block VII can be seen to be a combination of the circuits of blocks III to V, but configured to switch off the cellphone in accordance with the regulatory requirement.

In FIG. 7, under normal conditions when no restriction on cellphone use is stipulated, no signal appears at either the antenna input ANT or at the auxiliary terminal AUX. Consequently, the outputs of OP-AMP-2 and OP-AMP-6 of circuit II would remain low, and the outputs of gates NOR-1 and OR-2, and operational amplifier OP-AMP-5, gates NOT-2 and OR-4 of circuit II, and operational amplifier OP-AMP-7 of circuit VI would become high, while the output of gate NOT-1 of circuit II would be low. In this condition transistors Q1 and Q5 of circuit III, and transistor Q6 of circuit VI would be forward biased, while transistor Q2 of circuit IV would be reverse biased. Therefore, the OK switch S1 of circuit III would remain in an enabled condition, and the CPU of the cellphone would remain energized through the switching transistor Q6 of circuit VI. Also, under these conditions, signal levels at the output of operational amplifier OP-AMP-5 and gate NOT-1 of circuit II, and operational amplifier OP-AMP-7 of circuit VI would remain unchanged, and therefore OP-AMP-4 of circuit V and OP-AMP-8 of circuit VI would not receive any pulse inputs, and the outputs of gates OR3 of circuit V and OR5 of circuit VI would remain low resulting in blocking transistors Q3 of circuit V and Q7 of circuit VI. Hence, the OK, CALL END, and ON/OFF switches of the cellphone would continue to operate in a normal fashion and the cellphone can be used without any restriction.

However, when the driver of a vehicle having its ignition on and/or moving above a certain speed holds the cellphone, a signal of positive polarity would appear at the terminal ANT of circuit Is. Since this signal would be blocked by the diode D12 of circuit II, the CPU of the cellphone would continue to remain energized through the forward biased transistor Q6 of circuit VI, and the ON/OFF switch S3 would also operate in the normal manner. But the output of operational amplifier OP-AMP-2 would become high, thus driving the outputs of gates NOR1 and OR2, and operational amplifier OP-AMP-5 to a low value while the output of NOT1 would become high. Therefore, transistors Q1 and Q5 of circuit III will become reverse biased, and the OK switch will be disabled. If an attempt is made to press the OK switch in this condition, the emitter of transistor Q2 of circuit IV will be grounded resulting in a negative pulse current due to the discharge of capacitor C4 (initially charged through resistor R13, diode D10, and resistor R27 of circuit IV) to flow through diode Do1 1 and resistor R28 to the negative input of OP-AMP-4 of circuit V. This would drive the output of gate OR3 to be high leading to conduction of transistor Q3 of circuit V, and thus automatically performing the CALL END function. If a passenger other than a driver presses the OK switch S1 and hands over the cellphone to the driver, the output of operational amplifier OP-AMP-5 of circuit II would change from high to low causing a negative pulse current due to the discharge of capacitor C3 of circuit IV (already charged through diode D7 and resistor R18) to flow through diode D2 and resistor R17 of circuit IV to the negative input of operational amplifier OP-AMP-4 of circuit V. This would drive the output of gate OR3 to be high leading to conduction of transistor Q3, thus automatically performing the CALL END function. Since the OK switch remains disabled all through this condition, the driver will also not be able to call any number. Thus the proposed system comprehensively blocks cellphone use by the driver of a vehicle under the first condition.

In the second condition, the signal received at the terminal ANT would be negative, and would be blocked by diode D1 of circuit II, but would be transmitted to the negative input of operational amplifier OP-AMP-6 of circuit II through diode D12 and resistor R30, driving its output high, and the outputs of gates NOT2 and OR4 of circuit II, and operational amplifier OP-AMP-7 of circuit VI low. This would drive a negative pulse current due to the discharge of capacitor C7 (already charged through diode D14 and resistor R35 of circuit VI) to flow through diode D15 and resistor R36 to the negative input of operational amplifier OP-AMP-8 of circuit VI. This would drive the output of gate OR5 to be high leading to conduction of transistor Q7 of circuit VI, and thus automatically performing the switching OFF function of the cellphone. Furthermore, in this condition the low level of the output of operational amplifier OP-AMP-7 would keep transistor Q6 of circuit VI reverse biased and thus preclude energizing the CPU of the cellphone. Thus, all functional requirements on regulating cellphone use are met by the proposed system.

However, in case of an emergency, a secure switch S4 of circuit II can be switched on, feeding inputs to gates OR2 and OR4 driving their outputs high, thus ensuring normal operation of the cellphone irrespective of any other condition.

Figure 8:
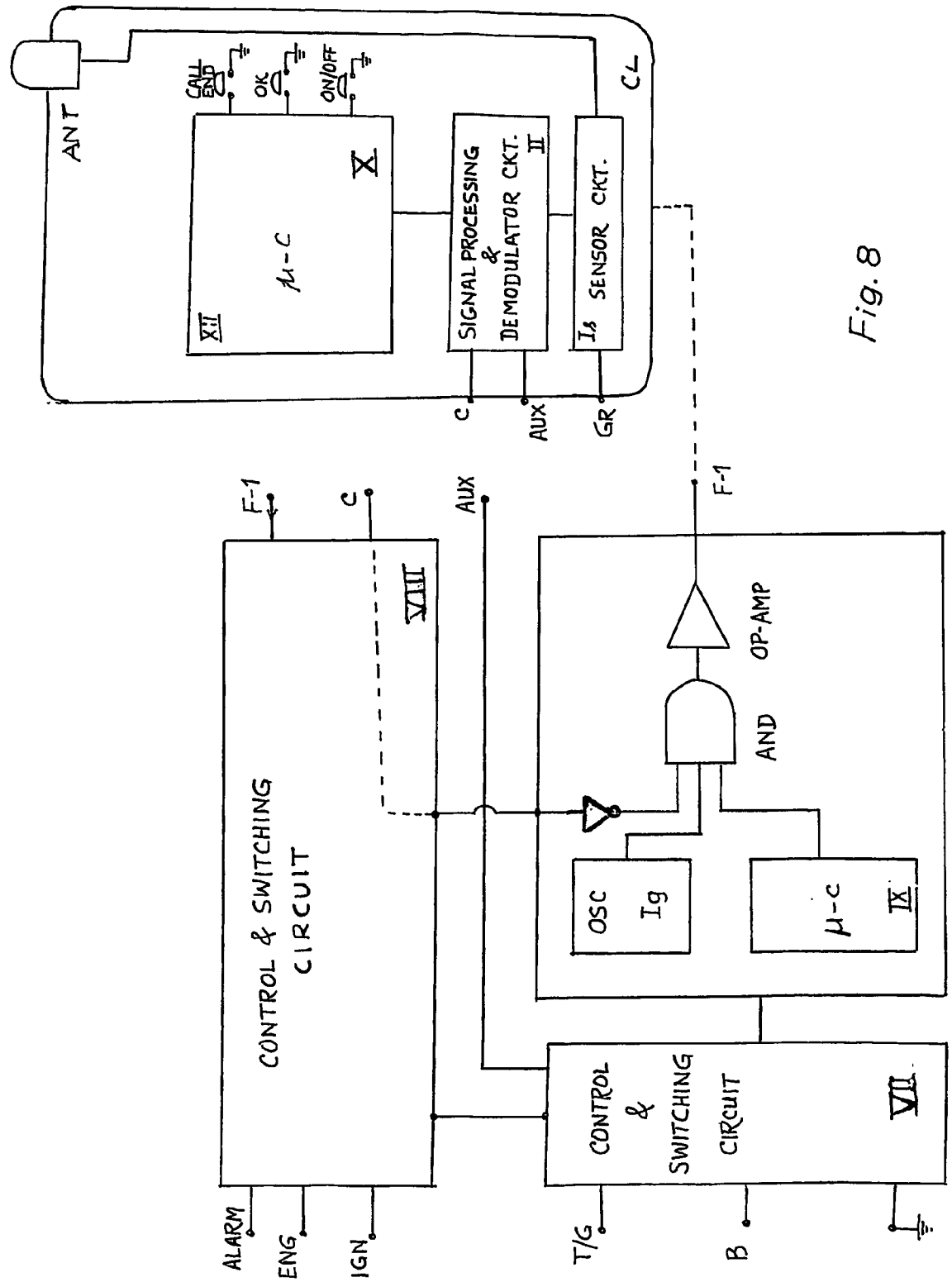
FIG. 8 shows a block diagram of an embodiment of the present invention.

Though the circuit shown in FIG. 7 describes a particular circuit for executing the various functions envisaged for the proposed device to regulate cellphone use, it would be apparent that any other circuit comprising a combination of analog, and logic circuit elements along with micro-controllers may be employed to achieve these functions as illustrated through the evolution of the circuits from FIG. 4 to FIG. 6, and from FIG. 3 to FIG. 7, as well as that of the block diagram of FIG. 5 to the block diagram of FIG. 8.

The block diagram of FIG. 8 illustrates an embodiment of a practical version of a Signal Generating Unit comprising the signal generator Ig and its associated control and switching circuits VII, and VIII. The micro-controller IX is programmed to generate distinct binary signals characterizing the stipulated regulatory regime corresponding to the first or the second condition. The block diagram of FIG. 8 also illustrates an embodiment of a practical version of a circuit to be incorporated in a cellphone and comprises the Signal Detection Circuit Is and a Signal Processing Circuit II similar to the circuit II of FIG. 7. The micro-controller X would detect the nature of the binary signature, and initiate an appropriate regulatory process through its output 20 terminals, said micro-controller X being present in a normal cellphone, or additionally the output of circuit II would be connected to the micro-controller X through an additional micro-processor (not shown).

The frequency and power level of the signal used in the proposed system is in a band that is known to cause no health hazard to human beings. However, if the driver of a vehicle desires not to expose himself even to this, he has an option to connect the cellphone to a socket on the signal generator unit through a chord. This would bring a positive signal from the terminal marked AUX in FIG. 6(a) to the terminal AUX in FIG. 7, and also connect the ground of the cellphone to the ground of the signal generator. This would drive the output of gates NOR1 and OR2, and operational amplifier OP-AMP-5 low, and maintain the cellphone in a disabled state. The chord will communicate a signal from the output of gate NOR2 of circuit II to the terminal C on the console of Signal Generating Unit, and would keep its oscillator Ig in an off state through its control port COP as long as this chord remains connected. If this connection is broken, the oscillator would be automatically switched on, and the OK switch would remain disabled for the driver as long as the ignition of the vehicle remains on.

We claim:

1. A device for disabling cellphone use in the presence of a first or a second condition, and enabling its normal functioning upon removal of said conditions, said first condition being that of a signal generated from a vehicle in motion, said second condition being that of a signal generated from a restricted area, said device comprising:
   (i) a signal generating circuit adapted to generate a polarity specific signal corresponding to said first or second condition;
   (ii) a signal detection and processing circuit provided within said cellphone for receiving and processing the signal from said signal generating circuit, said signal detection and processing circuit coupled to the signal generating circuit through a first capacitive coupling to the signal detection and processing circuit, and a second capacitive coupling provided in the cellphone and linked to the signal detection and processing circuit;
   (iii) an OK switch disabling circuit connected to said signal detection and processing circuit, said OK switch disabling circuit connected to the OK switch of the cellphone and disabling it in the presence of a signal corresponding to said first condition to said signal at an input to the signal detection and processing circuit;
   (iv) a link and control circuit connected to said OK switch disabling circuit for terminating a call if a cellphone in an operating mode is passed on to a driver by another passenger in the presence of said first condition as well as to said signal detection and processing circuit;
   (v) a call end circuit connected to said link and control circuit and also connected to the call end switch of the cellphone, and adapted to perform its function in the presence of a signal corresponding to the first condition at the input of said signal detection and processing circuit, when said OK switch is also disabled;
   (vi) said link and control circuit also connected to said signal detection and processing circuit and adapted to initiate the function of the call end circuit in the presence of said first condition; and
   (vii) a cellphone switching off circuit, linked to said signal detection and processing circuit, for switching off the cellphone and disabling its ON function in the presence of said second condition at the input to the signal detection and processing circuit.

2. A device as claimed in claim 1 wherein said second coupling comprises a conducting film disposed within said cellphone and connected to an antenna of said cellphone through a resistance.

3. A device as claimed in claim 1 wherein said signal detection and processing circuit is connected to said OK switch disabling circuit, and the call end circuit for blocking cellphone use by adapted to disable its OK switch and adapted to perform the call end function in the presence of said first condition, said call end circuit incorporating a switching circuit connected across the call end switch of the cellphone.

4. A device as claimed in claim 1 wherein said cellphone switching off circuit is connected to said signal detection and processing circuit, and adapted to perform the switching off function of the cellphone in the presence of said second condition.

5. A device as claimed in claim 1 wherein said signal generator is adapted to be connected to a power source through a control and switching circuit, and linked to a second control and switching circuit while configured for generating a signal for said first condition.

6. A device as claimed in claim 1 wherein a central signal generator is adapted to be connected to a power source through a main switch, and connected to individual seat foils through pressure actuated switches when configured for generating a signal indicating the presence of said second condition.

7. A device for disabling a cellphone in the presence of a first or a second condition and enabling said cellphone upon removal of said conditions, comprising a signal generating circuit for generating specified binary signature characterizing first or second conditions and connected to a power source through a first control and switching circuit and a second control and switching circuit, said signal generating circuit incorporating a micro-controller and linked to a signal detection and processing circuit through a first and second capacitive coupling for signal demodulation for regulating cellphone use through a micro-controller normally provided in a cellphone.

8. A device as claimed in claim 1 comprising an emergency switch to allow the dialing of a set of emergency numbers to override said first and second conditions.

* * * * *

UNITED STATES PATENT AND TRADEMARK OFFICE
CERTIFICATE OF CORRECTION

| | | |
|---|---|---|
| PATENT NO. | : 7,181,229 B2 | |
| APPLICATION NO. | : 10/490833 | |
| DATED | : February 20, 2007 | |
| INVENTOR(S) | : Singh et al. | |

It is certified that error appears in the above-identified patent and that said Letters Patent is hereby corrected as shown below:

On Title Page, Item (76)
The Fourth Inventor's first name should read --Lokinder Sing Verma, Gurgaon, INDIA.--

Signed and Sealed this

Nineteenth Day of June, 2007

JON W. DUDAS
*Director of the United States Patent and Trademark Office*